United States Patent
Uzelac et al.

(10) Patent No.: US 7,406,609 B2
(45) Date of Patent: *Jul. 29, 2008

(54) METHOD AND APPARATUS FOR MINIMIZING LEAKAGE CURRENT IN SEMICONDUCTOR LOGIC

(75) Inventors: Lawrence S. Uzelac, Auburn, CA (US); Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 11/221,694

(22) Filed: Sep. 8, 2005

(65) Prior Publication Data

US 2006/0005059 A1    Jan. 5, 2006

Related U.S. Application Data

(63) Continuation of application No. 10/625,584, filed on Jul. 22, 2003, now Pat. No. 6,957,354, and a continuation of application No. 09/469,986, filed on Dec. 21, 1999, now Pat. No. 6,611,918.

(51) Int. Cl.
G06F 1/00 (2006.01)
G06F 1/26 (2006.01)

(52) U.S. Cl. ........................... 713/300; 713/320

(58) Field of Classification Search ............... 327/537, 327/544; 713/320, 300
See application file for complete search history.

(56) References Cited

U.S. PATENT DOCUMENTS

| | | | |
|---|---|---|---|
| 5,461,338 A | * | 10/1995 | Hirayama et al. ........... 327/534 |
| 5,838,171 A | | 11/1998 | Davis |
| 5,909,140 A | | 6/1999 | Choi |
| 5,917,365 A | | 6/1999 | Houston |
| 6,097,113 A | * | 8/2000 | Teraoka et al. ............... 327/534 |
| 6,191,470 B1 | | 2/2001 | Forbes et al. |
| 6,307,233 B1 | | 10/2001 | Awaka et al. |
| 6,373,321 B1 | | 4/2002 | Yamauchi et al. |
| 6,380,798 B1 | | 4/2002 | Mizuno et al. |
| 6,715,090 B1 | | 3/2004 | Totsuka et al. |
| 2004/0158756 A1 | | 8/2004 | Tosuka et al. |

FOREIGN PATENT DOCUMENTS

| | | |
|---|---|---|
| JP | 10189884 A | 7/1998 |
| KR | 10-1998-0004940 | 3/1998 |
| KR | 10-1999-0078182 | 10/1999 |

OTHER PUBLICATIONS

Anonymous, *Diode Battery Back-Up Switch*, IBM Technical Disclosure Bulletin, vol. 30, No. 2, Jul. 1, 1987, p. 895.

(Continued)

*Primary Examiner*—Rehana Perveen
*Assistant Examiner*—Stefan Stoynov
(74) *Attorney, Agent, or Firm*—Fish & Richardson P.C.

(57) ABSTRACT

Leakage current in semiconductor logic can be minimized using the present systems and techniques. For example, a CMOS circuit for low leakage battery operation can connect a real time clock to the power supply when available or to a low leakage source when the power supply is not available.

20 Claims, 2 Drawing Sheets

OTHER PUBLICATIONS

Muhammad M. Khellah and M.I. Emasry, *Power Minimization of High-Performance Submicron CMOS Circuits Using a Dual-Vd Dual-Vth (DVDV) Approach*, Proceedings 1999 International Symposium on Low Power Electronics and Design, Aug. 1999, ACM, pp. 106-108.

K. Roy, Leakage power reduction in low-voltage CMOS designs, Electronics, Circuits and Systems, 1998 IEEE International Conference, vol. 2, 1998, pp. 167-173.

Office Action received in Korean Patent Application No. 10/2000/7008020.

Office Action received in Chinese Patent Application No. 00817542.X.

International Preliminary Examination Report received in PCT/US00/42597.

International Search Report received in PCT/US00/42597.

* cited by examiner

METHOD AND APPARATUS FOR MINIMIZING LEAKAGE CURRENT IN SEMICONDUCTOR LOGIC

PRIOR APPLICATION

This application is a continuation of U.S. patent application Ser. No. 10/625,584, filed Jul. 22, 2003, now U.S Pat. No. 6,957,354 and of U.S. patent application Ser. No. 09/469,986, filed Dec. 21, 1999, now U.S. Pat. No. 6,611,918.

BACKGROUND

The present application teaches a circuit for use in reducing power consumption of a real time clock in a computer system.

When a personal computer is turned off, an on-board battery, e.g. a 3-volt lithium battery, may still power certain circuits in the computer. For example, a real time clock often still maintains the time using battery power when the primary computer power supply goes offline.

The smaller transistors that are now used to make such circuits in order to fit more transistors on a substrate, often have higher leakage currents. These transistors consume undesired current when they are biased to the "off" state. This increases the DC load that is placed on the battery, when the computer power supply is off due to off state current, which can cause the battery to deplete more quickly.

SUMMARY

The present disclosure defines a device which reduces power consumption during battery powered operation of the Real Time Clock.

The application discloses a leakage reduction device for a real time clock system, that has a real time clock circuit, having separated first and second power supply connections, and maintaining a count indicative of real time; and an associated circuit, which operates in a first mode when a power supply voltage is present and operates in a second mode when battery power is present, said second mode providing a biasing condition that minimizes off state leakage current during battery operation.

DESCRIPTION OF DRAWINGS

These and other aspects will be described in detail with reference to the accompanying drawings, wherein.

DETAILED DESCRIPTION

The present application describes reducing the undesired current flow through transistors in a clock circuit. In an embodiment, the transistors are MOS devices. The sub-threshold off current of these MOS devices is reduced by applying a voltage bias to the substrate relative to the gate, source and drain voltages. The relative device threshold voltage is then increased according to the relation $$\Delta V_t = \left[\frac{(2\varepsilon_0\varepsilon_{ox}qN_a)^{1/2}}{C_{ox}}\right] \cdot \left[(2\phi_f - V_{bias})^{1/2} - (2\phi_f)^{1/2}\right]$$

The sub-threshold off current is also reduced according to the relation $$I_{off} = I_o \cdot e^{\frac{q}{KT}((V_{gs}-(vt+\Delta V_t))/n)}\left(1 - e^{\frac{q}{KT}v_{DS}}\right)$$

with $$I_o = \frac{\mu_v C_{ox} W_{eff}}{L_{eff}} \cdot \left(\frac{KT}{q}\right)^2 e^{1.8}$$

Figure 1:
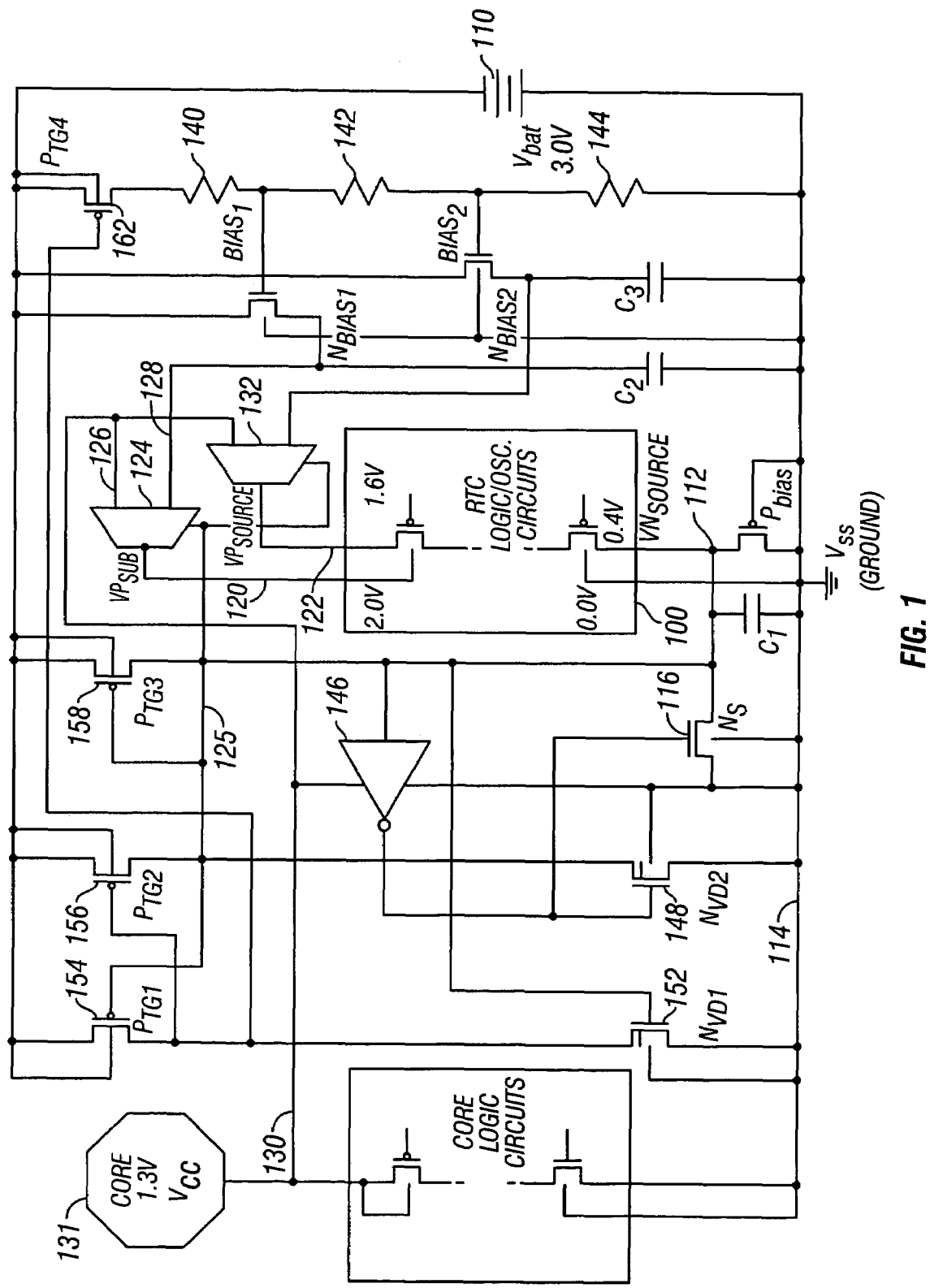
FIG. 1 shows a schematic diagram of the circuitry including the real time clock well.

A schematic diagram of a specific circuit, e.g., a computer chipset, is shown in FIG. 1. This circuit includes a real time clock circuit portion 100 that has separate power supply connections for the battery and for the wired power supply. The part that is always powered is separated from other circuits in the chip. The real time clock 100 is called the "RTC well" since it has the separate power supply connections. The separated connection enables battery 110, e.g., a 3.0 volt lithium battery, to be used to power the real time clock well while the remainder of the circuit is turned off.

An off-chip diode network has been used to isolate the battery from the computer's power supply once the computer is actually turned on.

The present application discloses circuitry forming a relative substrate bias which reduces the off current ($I_{off}$) of the real time clock circuit during battery operation. This is done by changing source voltage levels in the real time clock well when the main power supply is turned off.

Switching devices, described in more detail herein, are connected between the source and substrate connections of N-channel and P-channel real time clock devices in the well 100. This better isolates the substrate from the N-channel source connection and isolates the N well from the P-channel source connection during battery operation. These switches are in one state when primary chip power or "core power" is available. The switches are in another state when the primary chip power is off and the real time clock circuit 100 is powered by the battery 110. In this latter state, the bias voltage of the real time clock is raised to a level that decreases leakage. The real time clock logic continues to operate at the raised source voltage condition during the low-leakage battery operation.

The circuit and its control are illustrated in FIG. 1. The RTC well 100 has three power connection nodes. The $Vn_{source}$ power node 112 of the real time clock module 100 is controlled by N-channel switching transistor ($N_s$) 116. Energizing $N_S$ 116 selectively switches the $Vn_{source}$ node 112 to the $V_{ss}$ ground rail. When transistor 116 is deenergized, node 112 floats.

P-channel device well nodes of the real time clock include $Vp_{sub}$ 120, and $Vp_{source}$ 122. Multiplexers 124 and 132 control the power supplied to these nodes. These multiplexers can be thick-gate P-channel MOS devices. The $Vp_{sub}$ node is controlled by multiplexer 124. One input 126 to the multiplexer 124 is the core 1.3 volt power line 130 from power supply 131. The other input 128 to the multiplexer 124 is a power consumption-reducing bias level $N_{bias1}$. This bias level is formed by the biasing resistors 140, 142, 144 placed across the battery 110.

Analogously, the multiplexer 132 receives the core power supply 1.3 volts 130 at its one input, and a second bias level $N_{bias2}$ at the other input thereof.

These bias levels are selected to minimize the leakage. $Vp_{sub}$ (120) can be 2.0 volts, and $Vp_{source}$ (122) can be 1.6 volts.

Level shifting logic, including $N_{VD_1}$ (152), $N_{VD2}$ (148), $P_{TG1}$ (154), and $P_{TG2}$ (156) control the switching of the multiplexers 124 and 132. When core power 130 is present, inverter 146 is enabled and controls the gate voltages of the n-channel devices $N_S$ 116 and $N_{VD2}$ 148.

In normal operation, when the power supply 131 is on, an output voltage is produced on line 130. The inverter 146 is enabled, producing a high output that pulls up the gate voltage of the devices $N_S$ 116 and $N_{VD2}$ 148. Biasing $N_{VD2}$ 148 turns on $N_S$ 116 and connects the N-channel source node $Vn_{source}$ to ground 114.

Biasing of $N_{VD1}$ 152 causes $P_{TG1}$ and $P_{TG2}$ to raise the multiplex control line 125, switching the multiplexer units 124, 132. This connects the nodes $Vp_{sub}$ and $Vp_{source}$ to the core 1.3 volt power 130.

When core power 130 is not available, the real time clock 100 operates under battery power. The output of $V_{TG3}$ 158 pulls up the input to the inverter 146, thereby lowering the output of the inverter 146, and turning off the gate of $N_{VD2}$ 148 and $N_S$ 116. $N_S$ 116 isolates $Vn_{source}$ from ground 114. The multiplexer units 124, 132 are also caused to switch, thereby connecting the real time clock nodes $Vp_{sub}$ 120 and $Vp_{source}$ 122 to the bias voltages $N_{bias1}$ and $N_{bias2}$, respectively. This also causes device $P_{TG4}$ 162 to turn on, to establish the bias levels $bias_1$ and $bias_2$ across the resistor ladder, 140, 142, 144 using battery power. The bias resistors should be larger than 10 M ohms, to minimize current flow from the battery.

This circuit even further conserves battery power since the bias resistors are isolated from the battery during non-battery operation.

As noted above, these bias values are selected as values that will allow the RTC logic and oscillator circuits in the well 100 to operate at low leakage current levels. Selected bias levels include $Vn_{source}$ at 0.4 volts, $Vp_{sub}$ at 2.0 volts and $Vp_{source}$ at 1.6 volts.

The circuits in the real time clock well should continue to operate at all times. Capacitors C1, C2, C3 are used to decouple any switching noise during the transition between the two modes of operation to prevent the registers from being corrupted during a transition between the normal operation and the low leakage battery-powered operation.

These capacitors have a value of, for example 10 pF. In summary, the on and off conditions of the circuits during the two modes of operation are listed below in Table 1.

TABLE 1

|  | 1.3 V Core Power ON: (normal operation) | 1.3 V Core Power OFF: (low leakage operation) |
| --- | --- | --- |
| $N_S$ | ON | OFF |
| $N_{VD1}$ | OFF | ON |
| $N_{VD2}$ | ON | OFF |
| $P_{TG1}$ | ON | OFF |
| $P_{TG2}$ | OFF | ON |
| $P_{TG3}$ | ON | OFF |
| $P_{TG4}$ | OFF | ON |
| $N_{bias1}$ | OFF | ON |
| $N_{bias2}$ | OFF | ON |
| $Vn_{source}$ | 0 V | 0.4 V |
| $Vn_{sub}$ | 0 V | 0 V |
| $Vp_{source}$ | 1.3 V | 1.6 V |
| $Vp_{sub}$ | 1.3 V | 2.0 V |

Figure 2:
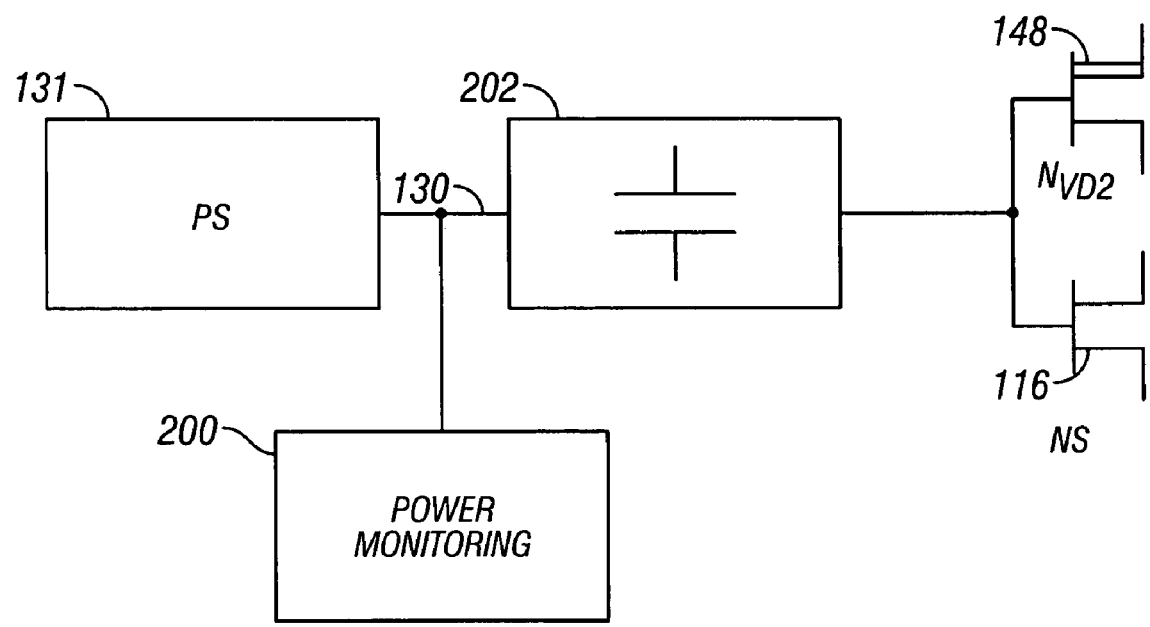
FIG. 2 shows a block diagram of a power monitoring embodiment.

A second embodiment is shown in block diagram form in FIG. 2. A hardware monitor device 200 monitors characteristics of the computer, including temperature, power supply level and other information. The device 200 produces a "power okay signal" when the power supply is up and running. This "power okay" signal is delayed by delay element 202 (e.g., a capacitor), and then drives the gates of $N_{VD2}$ and $N_S$ instead of the inverter 146 shown in the first embodiment.

Use of the power okay signal may help to isolate the real time clock well 100 from rail noise during a turn on sequence. For example, the hardware monitor could use a delay mechanism as shown, e.g., the power okay signal would only be produced after the power supply is stabilized. This keeps the real time well 100 isolated until the power supply is sufficiently stable.

Although not described in detail herein, other embodiments fall within the spirit and scope of the disclosed invention, as set forth in the appended claims.

What is claimed is:

1. An apparatus comprising:
   a first circuit; and
   a second circuit that operates in a normal mode and in a low leakage mode, said low leakage mode providing a biasing condition that reduces a sub-threshold off current for the first circuit by raising transistor source node voltage levels for the first circuit.

2. The apparatus of claim 1, wherein the first circuit comprises a multi-well, multi-mode circuit including combinational and sequential logic circuitry.

3. The apparatus of claim 2, wherein the second circuit comprises one or more switching devices between source and substrate connections of the multi-well, multi-mode circuit.

4. The apparatus of claim 1, further comprising decoupling capacitors that inhibit switching induced errors during transition between the normal mode and the low leakage mode.

5. The apparatus of claim 1, wherein the normal mode corresponds to when a primary power supply voltage is present and the low leakage mode corresponds to when a secondary power supply voltage is present, the apparatus further comprising a ready signal and a delay element that delays switching between the normal mode and the low leakage mode.

6. The apparatus of claim 1, wherein the first circuit comprises a real time clock circuit.

7. The apparatus of claim 1, wherein the normal mode corresponds to when a core power supply voltage is present and the low leakage mode corresponds to when a battery power supply voltage is present.

8. The apparatus of claim 1, wherein the apparatus comprises a personal computer.

9. A system comprising:
   logic means for performing computations;
   power supply means for operating the logic means in a first mode and in a second mode; and
   source-node-voltage-level modification means for providing a biasing condition to the logic means that minimizes leakage current in the second mode of operation of the logic means, wherein the source-node-voltage-level modification means comprises means for raising transistor source node voltage levels.

10. The system of claim 9, wherein the source-node-voltage-level modification means comprises means for level shifting and means for power supply multiplexing.

11. The system of claim 9, wherein the power supply means comprises means for providing core power in a personal computer.

12. The system of claim 9, wherein the power supply means comprises means for providing battery power.

13. The system of claim 12, wherein the means for providing battery power comprises means for forming bias levels for the biasing condition, the system further comprising means for isolating the means for forming bias levels during the first mode.

14. The system of claim 9, further comprising means for isolating the logic means during transition between the modes.

15. The system of claim 9, further comprising capacitive means for inhibiting switching induced errors during transition between the modes.

16. The system of claim 9, wherein the logic means comprises means for maintaining a count indicative of real time.

17. A method comprising:
    operating a circuit from a primary voltage source during a first mode of operation; and
    operating the circuit from a secondary voltage source during a second mode of operation that minimizes leakage current and reduces a sub-threshold off current for the circuit by raising transistor source node voltage levels for the circuit.

18. The method of claim 17, wherein operating the circuit from the primary voltage source comprises operating the circuit from a core power supply, and operating the circuit from the secondary voltage source comprises operating the circuit from a battery.

19. The method of claim 17, further comprising isolating the circuit during transition between the modes.

20. The method of claim 17, further comprising inhibiting switching induced errors during transition between the modes.

* * * * *